US012736184B2

(12) United States Patent
Douglas et al.

(10) Patent No.: US 12,736,184 B2
(45) Date of Patent: Sep. 15, 2026

(54) METHOD OF COMPRESSING HYDROGEN GAS, HYDROGEN GAS COMPRESSOR SYSTEM AND HYDROGEN GAS STORAGE UNIT

(71) Applicant: CATAGEN LIMITED, Belfast (GB)

(72) Inventors: Roy Douglas, Belfast (GB); Andrew Woods, Belfast (GB); Matthew Elliot, Belfast (GB)

(73) Assignee: CATAGEN LIMITED, Belfast (GB)

( * ) Notice: Subject to any disclaimer, the term of this patent is extended or adjusted under 35 U.S.C. 154(b) by 0 days.

(21) Appl. No.: 18/714,297

(22) PCT Filed: Nov. 29, 2022

(86) PCT No.: PCT/EP2022/083739

§ 371 (c)(1),
(2) Date: May 29, 2024

(87) PCT Pub. No.: WO2023/094712

PCT Pub. Date: Jun. 1, 2023

(65) Prior Publication Data

US 2025/0027611 A1 Jan. 23, 2025

(30) Foreign Application Priority Data

Nov. 29, 2021 (GB) ..................................... 2117223

(51) Int. Cl.
*F17C 7/00* (2006.01)

(52) U.S. Cl.
CPC ........ *F17C 7/00* (2013.01); *F17C 2201/0104* (2013.01); *F17C 2201/032* (2013.01);
(Continued)

(58) Field of Classification Search
CPC ........ F17C 2265/065; F17C 2227/0157; F17C 2221/012; F17C 2205/0169; F17C 2205/013
(Continued)

(56) References Cited

U.S. PATENT DOCUMENTS

| | | | | |
|---|---|---|---|---|
| 6,305,442 | B1 * | 10/2001 | Ovshinsky | C01B 3/38 141/2 |
| 6,745,801 | B1 * | 6/2004 | Cohen | C01B 3/00 141/2 |

(Continued)

FOREIGN PATENT DOCUMENTS

| | | | |
|---|---|---|---|
| DE | 102017204746 | A1 | 9/2018 |
| EP | 0898130 | A2 | 2/1999 |

(Continued)

OTHER PUBLICATIONS

Great Britian Search Report dated Apr. 5, 2022 which was issued in connection with GB2117223 .4.

(Continued)

*Primary Examiner* — Timothy L Maust
(74) *Attorney, Agent, or Firm* — Buckley, Maschoff & Talwalkar LLC

(57) ABSTRACT

The hydrogen gas compressor system (104, 108, 112) comprises a hydrogen gas storage unit (502) that defines an internal volume for storing hydrogen gas. An operating fluid delivery means (514) such as a pump delivers an operating fluid to the hydrogen gas storage unit (502). This causes the pressure of the hydrogen gas contained within the hydrogen gas storage unit (502) to increase. A coolant fluid delivery means (524) such as a pump delivers a coolant fluid to the hydrogen gas storage unit to absorb heat from the hydrogen gas.

23 Claims, 12 Drawing Sheets

(52) U.S. Cl.
CPC .................. *F17C 2205/013* (2013.01); *F17C 2205/0169* (2013.01); *F17C 2205/0323* (2013.01); *F17C 2205/0352* (2013.01); *F17C 2221/012* (2013.01); *F17C 2227/0157* (2013.01); *F17C 2227/0341* (2013.01); *F17C 2265/065* (2013.01)

(58) Field of Classification Search
USPC .......................................................... 141/231
See application file for complete search history.

(56) References Cited

U.S. PATENT DOCUMENTS

| | | | | |
|---|---|---|---|---|
| 7,624,770 | B2 * | 12/2009 | Boyd | F17C 5/007 141/82 |
| 8,069,885 | B2 * | 12/2011 | Kederer | F17C 5/007 62/48.1 |
| 2007/0258828 | A1 | 11/2007 | Adler et al. | |
| 2016/0238194 | A1 | 8/2016 | Adler et al. | |
| 2018/0119882 | A1 | 5/2018 | Allidieres | |
| 2020/0132254 | A1 | 4/2020 | Stephan et al. | |
| 2022/0193600 | A1 * | 6/2022 | Maehara | B01D 53/0407 |

FOREIGN PATENT DOCUMENTS

| | | | |
|---|---|---|---|
| FR | 3034164 | A1 | 9/2016 |
| JP | 2008-514844 | A | 7/2012 |
| KR | 102115454 | B1 | 5/2020 |
| WO | 2020196530 | A | 10/2020 |

OTHER PUBLICATIONS

International Search Report and Written Opinion dated Mar. 15, 2023 which was issued in connection with PCT/EP2022/083739.
International Preliminary Report on Patentability dated Mar. 14, 2024 which was issued in connection with PCT/EP2022/083739.
Annex to the International Preliminary Report on Patentability (Chapter II) which was filed in connection with PCT/EP2022/083739.
Japanese Office Action dated Jul. 30, 2025 which was issued in connection with Japanese Patent Application No. JP 2 024-5 3 1 5 28. English translation provided.

* cited by examiner

METHOD OF COMPRESSING HYDROGEN GAS, HYDROGEN GAS COMPRESSOR SYSTEM AND HYDROGEN GAS STORAGE UNIT

CROSS REFERENCE

This application is a US National Stage Application under 35 USC 371 claiming benefit of and priority to International Application No. PCT/EP2022/083739, filed on Nov. 29, 2022, and claiming benefit of and priority to Great Britian Application No. 2117223.4 filed on Nov. 29, 2021, each of which is incorporated by reference herein in their entirety.

The present disclosure is directed towards a method of compressing hydrogen gas, hydrogen gas compressor system and hydrogen gas storage unit. The hydrogen gas compressor system may be utilised in a hydrogen gas delivery system for delivering hydrogen gas from a hydrogen gas production system to an end consumer such as a vehicle.

BACKGROUND

Hydrogen gas can be produced in a variety of ways including steam reforming of natural gas, partial oxidation of methane, coal gasification, biomass gasification, methane pyrolysis with carbon capture, and electrolysis of water. The hydrogen gas is produced at a relatively low pressure which is typically in the range of 5 bar to 15 bar.

The hydrogen gas is required to be compressed to a higher pressure prior for transport, storage or delivery to an end hydrogen consumer. The compressed hydrogen gas may be deployed at a fueling station for fueling hydrogen vehicles.

Some existing methods for compressing hydrogen gas typically employ gaseous compressors and intercoolers to deliver hydrogen gas. These methods are relatively inefficient, expensive to manufacture and display thermal or overheating issues in operation.

It is an object of the present disclosure to provide an improved hydrogen gas compressor system for compressing hydrogen gas.

SUMMARY

There is provided a method of compressing hydrogen gas, hydrogen gas compressor system, and hydrogen gas storage unit as set out in the accompanying claims. Other features of the invention will be apparent from the dependent claims, and the description which follows.

According to a first aspect of the disclosure, there is provided a method of compressing hydrogen gas. The method comprises delivering an operating fluid to a hydrogen gas storage unit to increase the pressure of hydrogen gas contained within the hydrogen gas storage unit. The method comprises delivering a coolant fluid to the hydrogen gas storage unit to absorb heat from the hydrogen gas.

Advantageously, compression of the hydrogen gas contained within the hydrogen gas storage unit is achieved by delivering an operating fluid such as water into the hydrogen gas storage unit. The operating fluid decreases the available volume in the hydrogen gas storage unit for the hydrogen gas causing the hydrogen gas to compress and have a higher pressure. The operating fluid may act as a liquid piston.

Advantageously still, a coolant fluid is introduced into the hydrogen gas storage unit to absorb heat from the hydrogen gas. Compressing a gas causes the temperature of the gas under compression to increase. This is undesirable as raising the temperature of the gas decreases the gas density which can mean that an even higher pressure is required to deliver a required mass of gas from the hydrogen gas storage unit. Higher gas temperatures can also impact the operation and durability of components within the hydrogen gas compressor system or elsewhere in a hydrogen gas delivery system in which the hydrogen gas compressor system may be integrated. Moreover, the high temperatures can also increase the energy input required for compression reducing the efficiency of the process. Therefore, delivering coolant fluid to the hydrogen gas storage and compression unit helps to offset the increase in temperature of the hydrogen gas allowing for lower pressures to be used in gas delivery and reducing the amount of energy required by the compressor system.

In effect, the hydrogen gas storage and compression unit comprises a heat exchanger. The heat exchanger may be integrated into the hydrogen gas storage unit. The heat exchanger may comprise a coolant fluid circuit through which coolant fluid flows to absorb heat from the hydrogen gas.

The operating fluid and the coolant fluid may be delivered to the hydrogen gas storage unit simultaneously.

The method may further comprise delivering hydrogen gas to the hydrogen gas storage unit. The hydrogen gas may be delivered to a gas inlet of the hydrogen gas storage unit.

The method may further comprise withdrawing hydrogen gas from the hydrogen gas storage unit. The hydrogen gas may be withdrawn from a gas outlet of the hydrogen gas storage unit.

The operating fluid may be delivered to the hydrogen gas storage unit in response to hydrogen gas being withdrawn from the hydrogen gas storage unit so as to increase or sustain the pressure of the remaining hydrogen gas contained within the hydrogen gas storage unit.

Withdrawing hydrogen gas from a conventional hydrogen gas storage unit leads to the pressure of the remaining hydrogen gas within the hydrogen gas storage unit to decrease. Conversely, the pressure of the hydrogen gas within a receiver unit that receives the hydrogen gas from the hydrogen gas storage unit increases. This can make it challenging to consistently deliver hydrogen gas to the receiver unit.

Advantageously, operating fluid is delivered to the hydrogen gas storage unit in response to hydrogen gas being withdrawn from the hydrogen gas storage unit. This helps maintain the pressure of the hydrogen gas in the hydrogen gas storage unit allowing for consistent and efficient delivery of hydrogen gas from the hydrogen gas storage unit.

The hydrogen gas storage unit may define an internal volume for storing hydrogen gas. The operating fluid may be delivered to the internal volume. The operating fluid may therefore act as a liquid piston.

The hydrogen gas may be compressed to a pressure of at least 50 bar. The hydrogen gas may be compressed to a pressure of at least 100 bar. The hydrogen gas may be compressed to a pressure of at least 150 bar. The hydrogen gas may be compressed to a pressure of at least 200 bar. The hydrogen gas may be compressed to a pressure of at least 250 bar. The hydrogen gas may be compressed to a pressure of at least 250 bar. The hydrogen gas may be compressed to a pressure of at least 300 bar.

The hydrogen gas may be compressed to a pressure of at least 350 bar. The hydrogen gas may be compressed to a pressure of at least 400 bar. The hydrogen gas may be compressed to a pressure of at least 500 bar. The hydrogen gas may be compressed to a pressure of at least 600 bar. The hydrogen gas may be compressed to a pressure of at least 700 bar. The hydrogen gas may be compressed to a pressure of at least 800 bar. The hydrogen gas may be compressed to a pressure of at least 900 bar. The hydrogen gas may be compressed to a pressure of at least 1000 bar.

The hydrogen gas may be compressed to a pressure of between 50 bar and 1500 bar. The hydrogen gas may be compressed to a pressure of between 50 bar and 1000 bar. The hydrogen gas may be compressed to a pressure of between 50 bar and 900 bar. The hydrogen gas may be compressed to a pressure of between 50 bar and 800 bar. The hydrogen gas may be compressed to a pressure of between 50 bar and 700 bar. The hydrogen gas may be compressed to a pressure of between 50 bar and 600 bar. The hydrogen gas may be compressed to a pressure of between 50 bar and 500 bar. The hydrogen gas may be compressed to a pressure of between 50 bar and 400 bar. The hydrogen gas may be compressed to a pressure of between 50 bar and 350 bar.

The hydrogen gas may be compressed to a pressure of between 100 bar and 1500 bar. The hydrogen gas may be compressed to a pressure of between 150 bar and 1500 bar. The hydrogen gas may be compressed to a pressure of between 200 bar and 1500 bar. The hydrogen gas may be compressed to a pressure of between 250 bar and 1500 bar. The hydrogen gas may be compressed to a pressure of between 300 bar and 1500 bar. The hydrogen gas may be compressed to a pressure of between 350 bar and 1500 bar. The hydrogen gas may be compressed to a pressure of between 400 bar and 1500 bar. The hydrogen gas may be compressed to a pressure of between 500 bar and 1500 bar. The hydrogen gas may be compressed to a pressure of between 600 bar and 1500 bar. The hydrogen gas may be compressed to a pressure of between 700 bar and 1500 bar. The hydrogen gas may be compressed to a pressure of between 800 bar and 1500 bar.

The hydrogen gas may be compressed from an initial pressure of less than 30 bar to a pressure of at least 50 bar. The hydrogen gas may be compressed from an initial pressure of less than 20 bar to a pressure of at least 50 bar. The hydrogen gas may be compressed from an initial pressure of less than 15 bar to a pressure of at least 50 bar. The hydrogen gas may be compressed from an initial pressure of less than 10 bar to a pressure of at least 50 bar.

The operating fluid may be water. The operating fluid may be an ionic fluid. Other operating fluids may also be used.

According to a second aspect of the disclosure, there is provided a hydrogen gas compressor. The hydrogen gas compressor system comprises a hydrogen gas storage unit defining an internal volume for storing hydrogen gas. The hydrogen gas compressor system comprises an operating fluid delivery means arranged to deliver an operating fluid to the hydrogen gas storage unit to increase the pressure of hydrogen gas contained within the hydrogen gas storage unit. The hydrogen gas compressor system further comprise a coolant fluid delivery means arranged to deliver a coolant fluid to the hydrogen gas storage unit to absorb heat from the hydrogen gas.

The hydrogen gas storage unit may comprise a fluid inlet via which the operating fluid is delivered to the hydrogen gas storage unit. The fluid inlet may be positioned towards the base of the hydrogen gas storage unit.

The hydrogen gas storage unit may comprise a fluid outlet via which the operating fluid is withdrawn from the hydrogen gas storage unit. The fluid outlet may be positioned towards the base of the hydrogen gas storage unit.

The hydrogen gas storage unit may comprise a gas outlet via which hydrogen gas may be withdrawn from the hydrogen gas storage unit. The hydrogen gas storage unit may comprise a fluid inlet via which the operating fluid is delivered to the hydrogen gas storage unit. The gas outlet may be located above the fluid inlet. The hydrogen gas storage unit may comprise a fluid outlet via which the operating fluid is withdrawn from the hydrogen gas storage unit. The gas outlet may be located above the fluid outlet.

The hydrogen gas storage unit may comprise a gas inlet via which hydrogen gas may be delivered to the hydrogen gas storage unit. The hydrogen gas storage unit may comprise a fluid inlet via which the operating fluid is delivered to the hydrogen gas storage unit. The gas inlet may be located above the fluid inlet. The hydrogen gas storage unit may comprise a fluid outlet via which the operating fluid is withdrawn from the hydrogen gas storage unit. The gas inlet may be located above the fluid outlet.

The hydrogen gas storage unit may comprise a plurality of cylinders arranged to store the hydrogen gas. The plurality of cylinders may be vertically aligned with one another. The plurality of cylinders may all be in communication with the operating fluid delivery means and/or the coolant fluid delivery means.

The hydrogen gas compressor system may comprise a controller for controlling the delivery of operating fluid and/or coolant fluid to the hydrogen gas storage unit.

The hydrogen gas storage unit may comprise a coolant fluid circuit via which the coolant fluid may flow through the hydrogen gas storage unit. The coolant fluid circuit separates the coolant fluid from the hydrogen gas and operating fluid. The coolant fluid circuit may traverse through the internal volume in which the hydrogen gas is stored. The coolant fluid circuit may comprise a pipe or a network of pipes.

According to a third aspect of the disclosure, there is provided a hydrogen gas storage unit defining an internal volume for storing hydrogen gas. The hydrogen gas storage unit comprises an operating fluid inlet for receiving operating fluid for increasing the pressure of hydrogen gas contained within the hydrogen gas storage unit. The hydrogen gas storage unit comprises a coolant fluid inlet for receiving coolant fluid to absorb heat from the hydrogen gas.

The hydrogen gas storage unit may comprise a gas inlet for introducing hydrogen gas to the internal volume. The gas inlet may be located above the fluid inlet. The hydrogen gas storage unit may comprise a fluid outlet via which the operating fluid is withdrawn from the hydrogen gas storage unit. The gas inlet may be located above the fluid outlet.

The hydrogen gas storage unit may comprise a gas outlet for withdrawing gas from the internal volume. The gas outlet may be located above the fluid inlet. The hydrogen gas storage unit may comprise a fluid outlet via which the operating fluid is withdrawn from the hydrogen gas storage unit. The gas outlet may be located above the fluid outlet.

The fluid inlet may be positioned towards the base of the hydrogen gas storage unit.

The hydrogen gas storage unit may comprise a fluid outlet via which the operating fluid is withdrawn from the hydrogen gas storage unit. The fluid outlet may be positioned towards the base of the hydrogen gas storage unit.

The hydrogen gas storage unit may comprise a plurality of cylinders arranged to store the hydrogen gas. The plurality of cylinders may be vertically aligned with one another.

The hydrogen gas storage unit may comprise a coolant fluid circuit via which the coolant fluid may flow through the hydrogen gas storage unit. The coolant fluid circuit separates the coolant fluid from the hydrogen gas and operating fluid. The coolant fluid circuit may traverse through the internal volume in which the hydrogen gas is stored. The coolant fluid circuit may comprise a pipe or a network of pipes.

According to a fourth aspect of the disclosure, there is provided a method of dispensing hydrogen gas. The method comprises withdrawing hydrogen gas from a hydrogen gas storage unit. The method comprises delivering an operating fluid to the hydrogen gas storage unit to increase the pressure of the remaining hydrogen gas contained within the hydrogen gas storage unit.

The method may further comprise providing the hydrogen gas storage unit with a predetermined amount of hydrogen gas.

The method may comprise coupling the hydrogen gas storage unit to a fluid delivery means for delivering the operating fluid.

The method may comprise decoupling the hydrogen gas storage unit from the fluid delivery means.

According to a fifth aspect of the disclosure, there is provided a hydrogen gas compressor system. The hydrogen gas compressor system comprises a hydrogen gas storage unit defining an internal volume for storing hydrogen gas, the hydrogen gas storage unit comprising a gas outlet via which hydrogen gas may be withdrawn from the hydrogen gas storage unit. The hydrogen gas storage unit comprises an operating fluid delivery means arranged to deliver, in response to hydrogen gas being withdrawn from the hydrogen gas storage unit, an operating fluid delivered to the hydrogen gas storage unit to increase the pressure of the remaining hydrogen gas contained within the hydrogen gas storage unit.

The hydrogen gas storage unit may have an internal volume of greater than 10 $m^3$. The internal volume may be greater than 20 $m^3$. The internal volume may be greater than 30 $m^3$. The internal volume may be greater than 50 $m^3$. The internal volume may be greater than 100 $m^3$. The internal volume may be greater than 200 $m^3$. The internal volume may be greater than 300 $m^3$. The internal volume may be greater than 400 $m^3$.

The internal volume may be between 10 $m^3$ and 500 $m^3$. The internal volume may be between 10 $m^3$ and 400 $m^3$. The internal volume may be between 10 $m^3$ and 300 $m^3$. The internal volume may be between 10 $m^3$ and 200 $m^3$. The internal volume may be between 10 $m^3$ and 100 $m^3$. The internal volume may be between 10 $m^3$ and 50 $m^3$. The internal volume may be between 50 $m^3$ and 500 $m^3$. The internal volume may be between 100 $m^3$ and 500 $m^3$. The internal volume may be between 200 $m^3$ and 500 $m^3$. The internal volume may be between 300 $m^3$ and 500 $m^3$. The internal volume may be between 400 $m^3$ and 500 $m^3$ According to a fifth aspect of the disclosure, there is provided a hydrogen gas storage unit defining an internal volume for storing hydrogen gas, the internal volume being greater than 10 $m^3$, the hydrogen gas storage unit further comprising an operating fluid inlet and for receiving operating fluid for increasing the pressure of hydrogen gas contained within the hydrogen gas storage unit.

The internal volume may be greater than 20 $m^3$. The internal volume may be greater than 30 $m^3$. The internal volume may be greater than 50 $m^3$. The internal volume may be greater than 100 $m^3$. The internal volume may be greater than 200 $m^3$. The internal volume may be greater than 300 $m^3$. The internal volume may be greater than 400 $m^3$.

The internal volume may be between 10 $m^3$ and 500 $m^3$. The internal volume may be between 10 $m^3$ and 400 $m^3$. The internal volume may be between 10 $m^3$ and 300 $m^3$. The internal volume may be between 10 $m^3$ and 200 $m^3$. The internal volume may be between 10 $m^3$ and 100 $m^3$. The internal volume may be between 10 $m^3$ and 50 $m^3$. The internal volume may be between 50 $m^3$ and 500 $m^3$. The internal volume may be between 100 $m^3$ and 500 $m^3$. The internal volume may be between 200 $m^3$ and 500 $m^3$. The internal volume may be between 300 $m^3$ and 500 $m^3$. The internal volume may be between 400 $m^3$ and 500 $m^3$.

BRIEF DESCRIPTION OF THE DRAWINGS

Examples of the present disclosure will now be described with reference to the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise.

Figure 1:
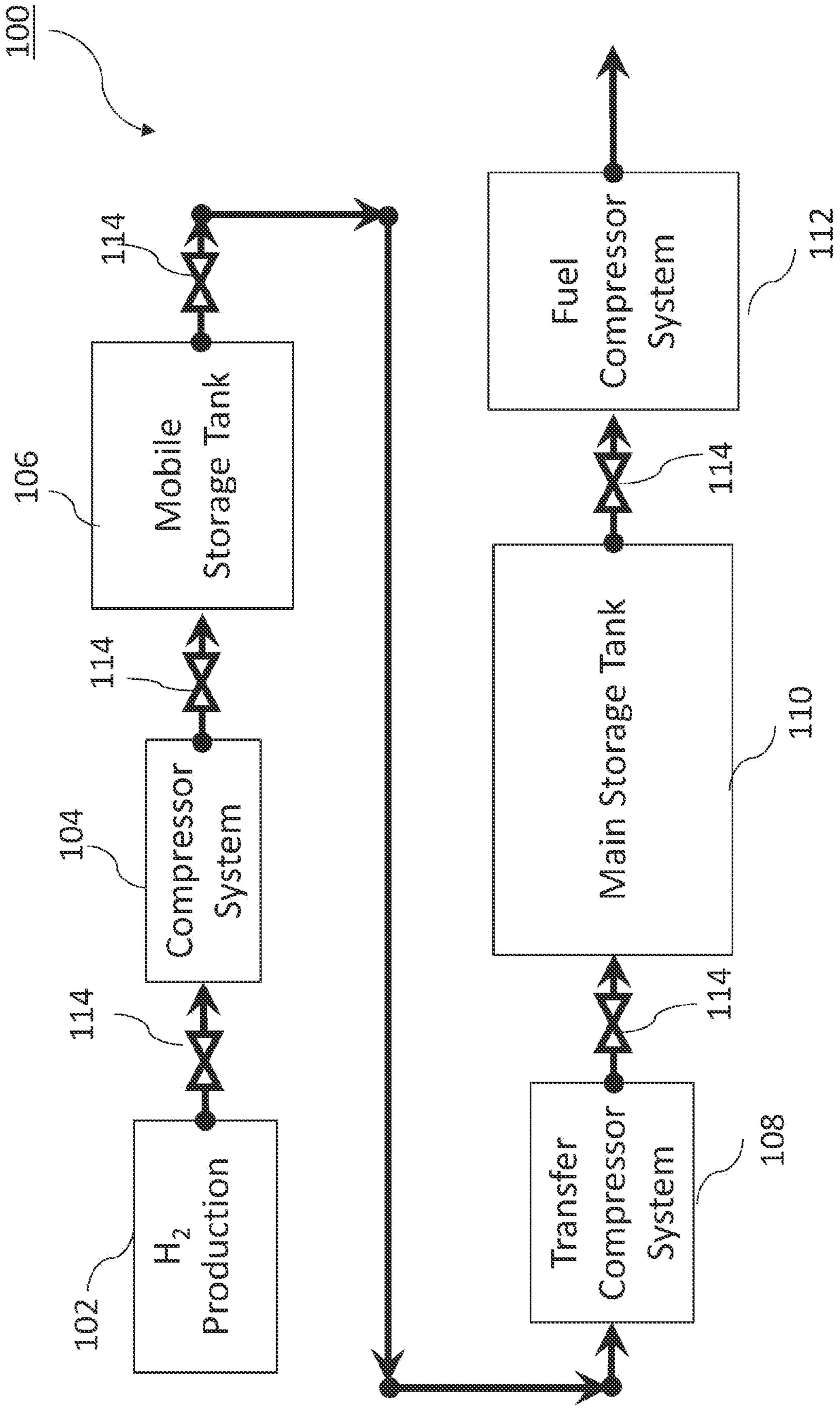
FIGS. 1 to 4 show schematic diagrams of example hydrogen gas delivery systems according to aspects of the present disclosure.

FIG. 1 shows a hydrogen gas delivery system 100 according to aspects of the present disclosure.

A hydrogen gas production system 102 produces hydrogen gas. The produced hydrogen gas typically has a low pressure. Generally, produced hydrogen gas has a pressure of less than 30 bar, the pressure may be less than 20 bar, and the pressure may be less than 15 bar. The pressure of the hydrogen gas may be in the region of 5 bar to 15 bar or it may be less than 5 bar, or close to atmospheric pressure.

Hydrogen gas can be produced in a variety of ways including steam reforming of natural gas, partial oxidation of methane, coal gasification, biomass gasification, methane pyrolysis with carbon capture, and electrolysis of water.

The hydrogen gas produced by the hydrogen gas production system 102 is compressed to reach a higher pressure for transport and delivery to an end consumer. The hydrogen gas compressor system 104 compresses the hydrogen gas to a desired higher pressure. The hydrogen gas compressor system 104 is located at the hydrogen gas production site.

In this example, the hydrogen gas is compressed by the hydrogen gas compressor system 104 to a pressure of between 250 bar and 350 bar. Other and even higher pressures may be achieved.

The hydrogen gas compressor system 104 in this example is a multi-stage compression system. A first stage of the compression system boosts the pressure of the hydrogen gas to an initial pressure typically of about 50 bar. The pressurised hydrogen gas is delivered to a hydrogen gas storage unit where it undergoes a further stage of compression to reach the desired high pressure. A multi-stage compression system is not required in all examples.

The compressed hydrogen gas is delivered to a mobile storage tank 106. The mobile storage tank 106 is mobile in the sense that it can be moved from the hydrogen gas production site to a hydrogen storage site or other location like a hydrogen fueling site. The mobile storage tank 106 is typically transported by a fuel tanker which may be any form of vehicle used to transport hydrogen fuel as known in the art.

The mobile storage tank 106 in this example has a volume of between 30 $m^3$ and 50 $m^3$ for storing hydrogen gas. Other capacities of mobile storage tank 106 are within the scope of the present disclosure. The mobile storage tank 106 may be arranged to store hydrogen gas at a pressure of between 250 bar and 350 bar. The pressure of the hydrogen gas stored in the mobile storage tank is not limited to this pressure range. Other and even higher pressures may be used.

The mobile storage tank 106 typically comprises a plurality of pressure vessels (e.g. cylinders) for storing hydrogen gas. Between 200 to 500 pressure vessels may be provided in some examples. The mobile storage tank 106 may also comprise a housing such as a shipping container which allows for easy transport and storage of the mobile storage tank 106.

It will be appreciated that a plurality of mobile storage tanks 106 may be located at the hydrogen gas production site and may be filled by the hydrogen gas compressor system 104. The plurality of mobile storage tanks 106 may be filled at the same time.

In this example, the mobile storage tank 106 is transported by the fuel tanker to a hydrogen fueling site. Fuel tankers typically have a capacity of between 30 $m^3$ and 70 $m^3$ for storing hydrogen gas and can store between 500 kg and 1500 kg of hydrogen gas. Fuel tankers are normally containerised, multi-tube, high-pressure tanks.

At the hydrogen storage site, the hydrogen gas is transferred from the mobile storage tank 106 to a storage tank 110 located at the hydrogen fueling site using a transfer compressor system 108.

In some examples, the transfer compressor system 108 is a dedicated compressor system. The dedicated compressor system comprises a hydrogen gas storage unit that receives hydrogen gas from the mobile storage tank 106 and delivers the hydrogen gas to the storage tank 110.

In preferred examples, the mobile storage tank 106 is used as the hydrogen gas storage unit for the transfer compressor system 108. In effect, the mobile storage tank 106 is used as the compression vessel. This approach reduces the complexity of gas delivery from the storage tanks as fewer components are required.

The storage tank 110 located at the hydrogen fueling site may have a larger capacity than the mobile storage tank 106 and may be referred to as a main storage tank 110. The main storage tank 110 may have a volume of between 100 $m^3$ and 500 $m^3$. The main storage tank 110 may be arranged to store hydrogen gas at a pressure of between 300 bar and 500 bar. Other and even higher pressures may be used.

The main storage tank 110 typically comprises a plurality of pressure vessels (e.g. cylinders) for storing hydrogen gas. At least 200 pressure vessels may be provided in some examples. The main storage tank 110 may also comprise a housing such as multiple shipping containers or a fixed structure.

The compressed hydrogen fuel is delivered to end consumers (e.g., vehicles) using a fuel compressor system 112.

In some examples, the fuel compressor system 112 is a dedicated compressor system. The dedicated compressor system comprises a hydrogen gas storage unit that receives hydrogen gas from the main storage tank 110 and delivers the hydrogen gas to the end consumer.

In preferred examples, the main storage tank 110 is used as the hydrogen gas storage unit for the fuel compressor system 112. In effect, the main storage tank 110 is used as the compression cylinder. This approach reduces the complexity of gas delivery from the storage tanks as fewer components are required.

Valves 114 are provided to control the flow of hydrogen gas around the hydrogen fuel delivery system 100.

Figure 2:
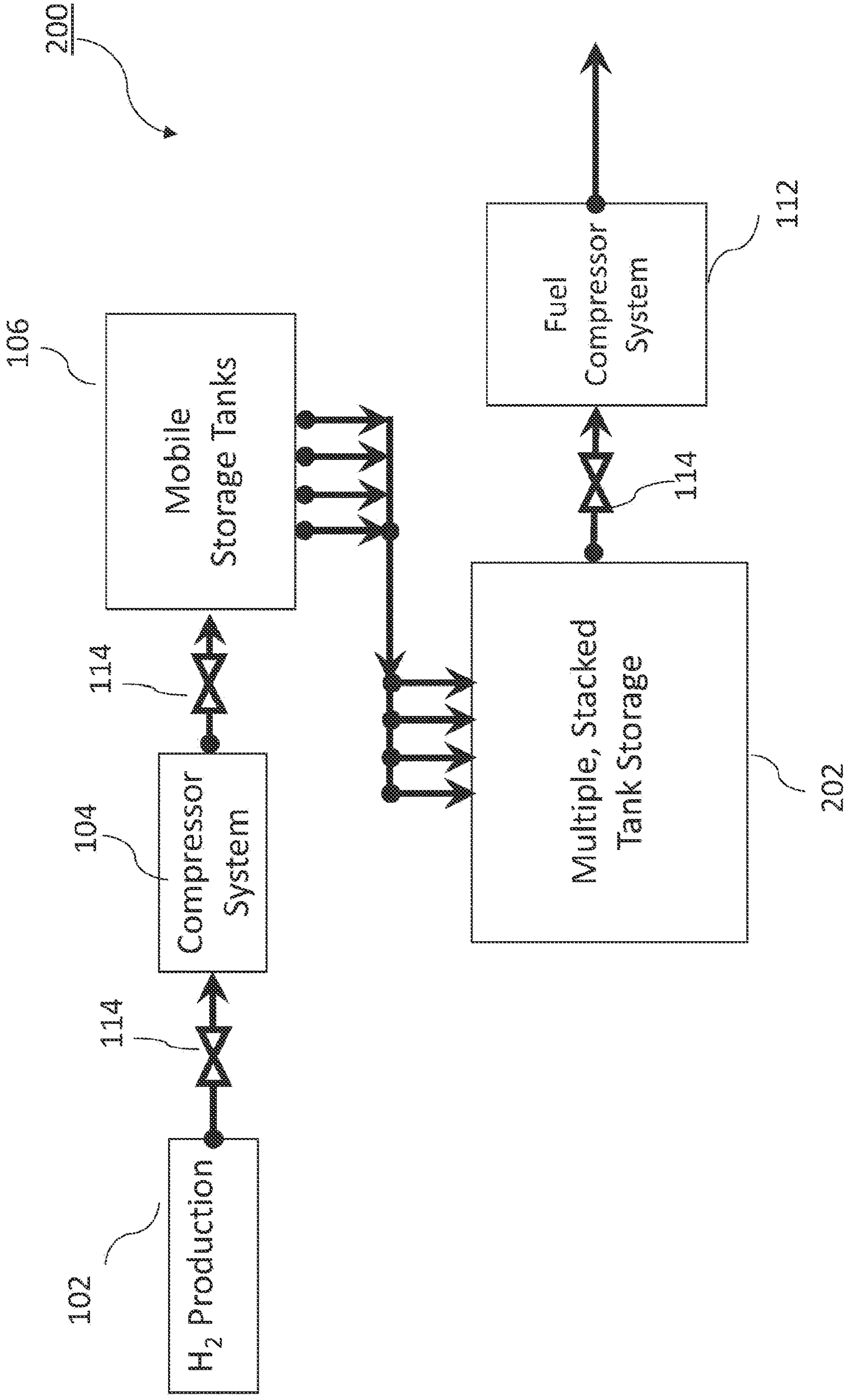

FIG. 2 shows another example hydrogen gas delivery system 200 according to aspects of the present disclosure.

As per the example of FIG. 1, hydrogen gas is produced at a hydrogen gas production system 102 and compressed to a high pressure using a hydrogen gas compressing system 104. The compressed hydrogen gas is stored in mobile storage tanks 106 which are transported from the hydrogen gas production site to a hydrogen fueling site.

The hydrogen gas is not transferred to a main storage tank at the hydrogen fueling site. Instead, the mobile storage tank 106 is stored at the hydrogen fueling site. The mobile storage tank 106 is stored with other mobile storage tanks to form a stacked hydrogen storage structure. The mobile storage tank 106 in this example may be a containerised unit. It will be appreciated that in this example, a transfer compressor system is not required.

In an example, between 5 and 20 mobile storage tanks are stored together to form the stacked hydrogen storage structure. The stacked hydrogen storage structure may have a volume of between 100 $m^3$ and 500 $m^3$ and may store hydrogen gas at a pressure of between 250 bar and 250 bar.

The compressed hydrogen fuel is delivered to end consumers (e.g., vehicles) using a fuel compressor system 112 as per the example of FIG. 1.

Valves 114 are provided to control the flow of hydrogen gas around the hydrogen fuel delivery system 200.

Figure 3:
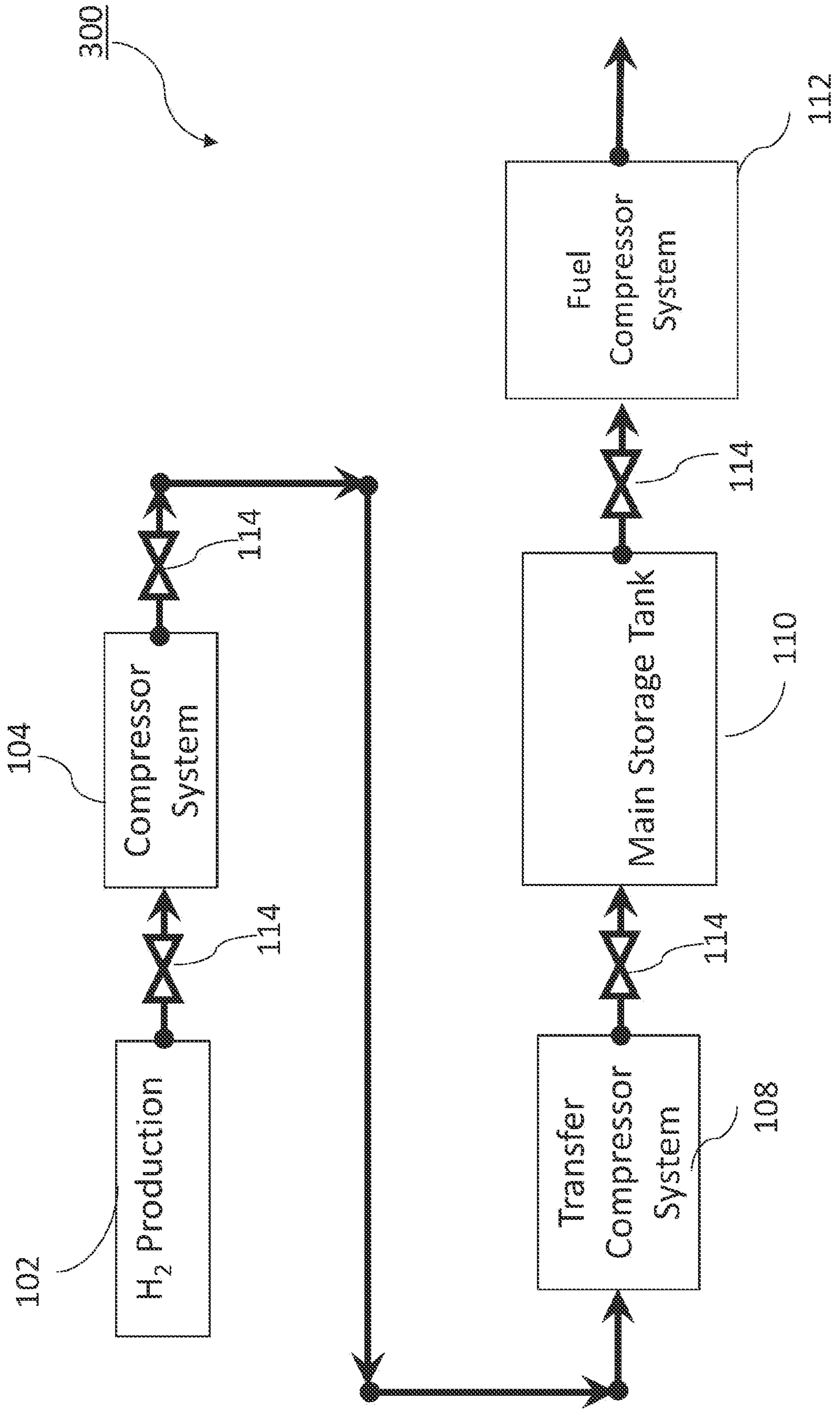

FIG. 3 shows another example hydrogen gas delivery system 300 according to aspects of the present disclosure.

As per the example of FIG. 1, hydrogen gas is produced at a hydrogen gas production system 102 and compressed to a high pressure using a hydrogen gas compressor system 104.

In this example, the hydrogen is produced, stored and delivered to end consumers at the same location. The compressed hydrogen gas is not delivered to mobile storage tanks, but is instead transferred directly to an on-site main storage tank 110 using a transfer compressor system 108.

The compressed hydrogen fuel is delivered to end consumers (e.g., vehicles) using a fuel compressor system 112 as per the example of FIG. 1.

Valves 114 are provided to control the flow of hydrogen gas around the hydrogen fuel delivery system 300.

Figure 4:
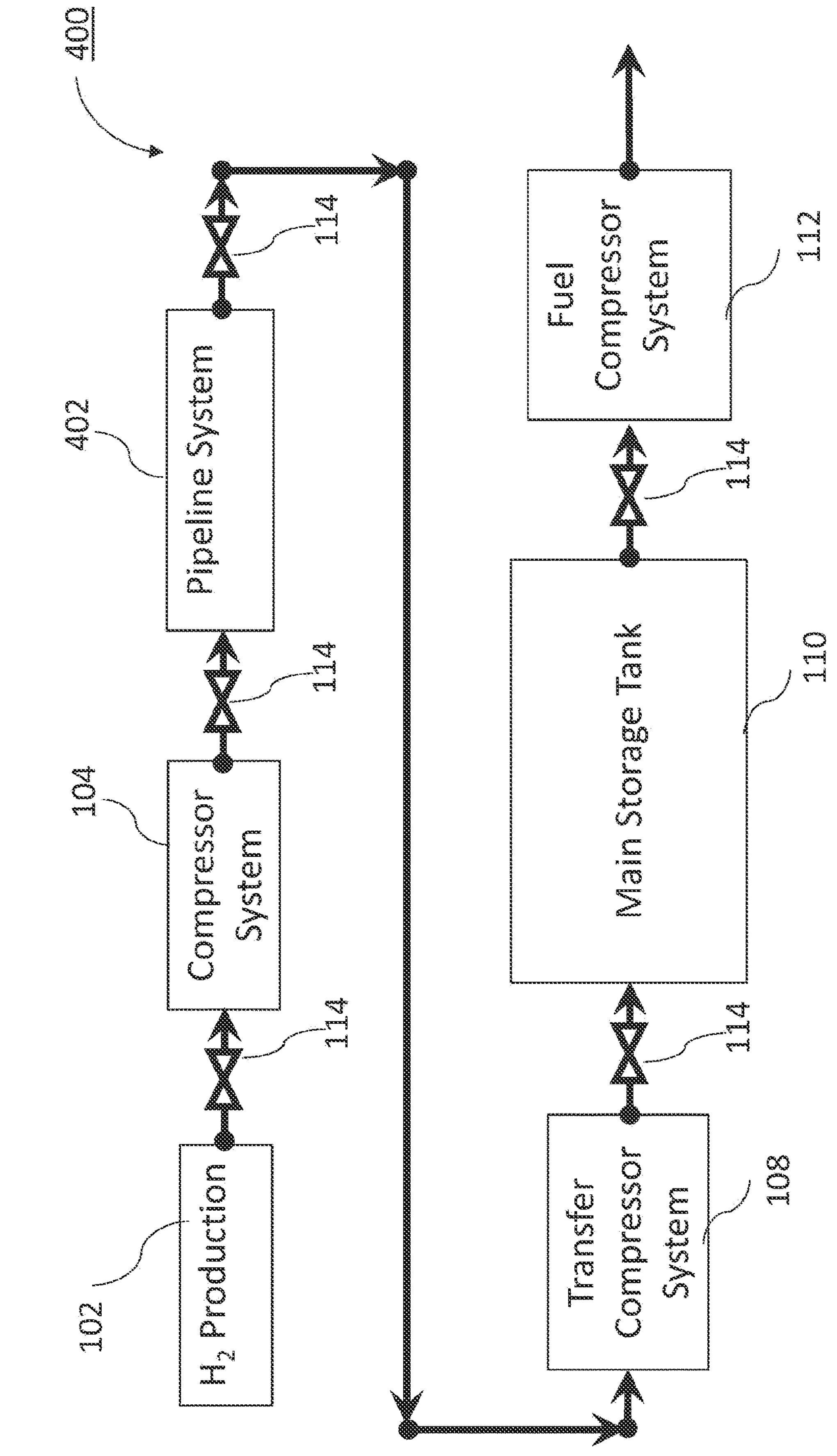

FIG. 4 shows another example hydrogen gas delivery system 400 according to aspects of the present disclosure.

As per the example of FIG. 1, hydrogen gas is produced at a hydrogen gas production system 102 and compressed to a high pressure using a hydrogen gas compressing system 104.

In this example, the compressed hydrogen gas is transferred to a pipeline system 402 for transfer from the hydrogen gas production site to the fueling site. The delivery pressure for pipeline transport may be in the region of 10 bar to 100 bar. At the fueling site, the hydrogen gas is transferred from the pipeline system to a main storage stank 110 using a transfer compressor system 108. At the fueling site, the hydrogen gas is further compressed by the transfer compressor system 108 to a higher pressure such as in the range of 300 bar to 500 bar.

The compressed hydrogen fuel is delivered to end consumers (e.g., vehicles) using a fuel compressor system 112 as per the example of FIG. 1.

Valves 114 are provided to control the flow of hydrogen gas around the hydrogen fuel delivery system 400.

The above example hydrogen gas delivery systems 100-400 all use hydrogen gas compression at various stages of the delivery process. Hydrogen gas is initially compressed to a high pressure at the production site using compressor system 104. Transfer compressor system 108, when provided, is used to deliver (i.e., pump) hydrogen gas to the main storage tank 110. Fuel compressor system 112 is used to deliver (i.e., pump) hydrogen gas from storage to the end consumer.

The present disclosure is directed towards providing improved methods, systems, and hydrogen gas storage units for hydrogen gas compression which may be used at any of the hydrogen gas compression stages in the above deliver system 100-400 or in other applications where hydrogen gas compression is desired.

Figure 5:
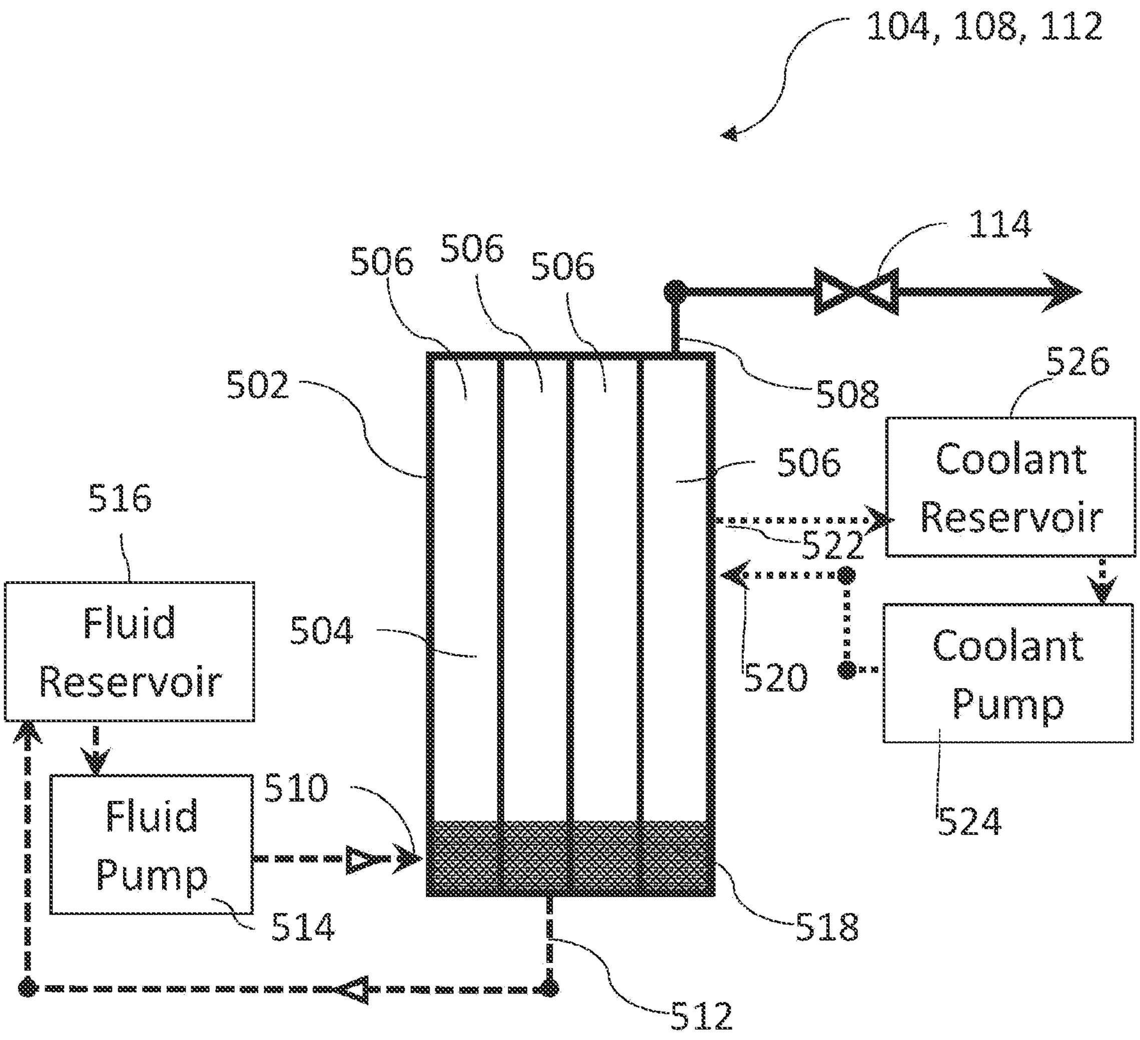
FIGS. 5 to 7 show schematic diagrams of example hydrogen gas compressor systems according to aspects of the present disclosure.

FIG. 5 shows an example hydrogen gas compressor system 104, 108, 112 in accordance with aspects of the present disclosure.

The hydrogen gas compressor system 104, 108, 112 comprises a hydrogen gas storage unit 502 that defines an internal volume 504 for storing hydrogen gas. The hydrogen gas storage unit 502 in this example comprises a plurality (four in this example for illustration purposes only) of cylinders 506 for storing the hydrogen gas. The cylinders 506 may be referred to as compressor cylinders. The cylinders 506 are vertically aligned along their axis.

The hydrogen gas storage unit 502 comprises a gas outlet 508 via which compressed hydrogen gas may be delivered (i.e., pumped) from the hydrogen gas storage unit 502. A valve 114 is used to control the flow of hydrogen gas from the hydrogen gas outlet 508 to allow for the selective delivery of hydrogen gas. It will be appreciated that when a plurality of cylinders 506 are provided in the hydrogen gas storage unit 502, the hydrogen gas may be withdrawn from each of the plurality of cylinders 506. A single gas outlet 508 may be operatively connected to the plurality of cylinders 506 or a plurality of gas outlets may be provided each associated with one or more of the cylinders 506.

The hydrogen gas storage unit 502 further comprises a fluid inlet 510 via which an operating fluid may be delivered to the hydrogen gas storage unit 502. The operating fluid is delivered to the hydrogen gas storage unit 502 via the fluid inlet so as to decrease the available volume in the hydrogen gas storage unit 502 for the hydrogen gas to thereby cause the hydrogen gas to compress and the pressure of the hydrogen gas to increase. It will be appreciated that when a plurality of cylinders 506 are provided in the hydrogen gas storage unit 502, the operating fluid may be delivered to each of the plurality of cylinders 506. A single fluid inlet 510 may be operatively connected to the plurality of cylinders 506 or a plurality of fluid inlets may be provided each associated with one or more of the cylinders 506.

The operating fluid may be water or may be an ionic fluid. Other forms of operating fluid may be used.

The hydrogen gas storage unit 502 further comprises a fluid outlet 512 via which the operating fluid may be withdrawn from the hydrogen gas storage unit 502. It will be appreciated that when a plurality of cylinders 506 are provided in the hydrogen gas storage unit 502, the operating fluid may be withdrawn from each of the plurality of cylinders 506. A single fluid outlet 512 may be operatively connected to the plurality of cylinders 506 or a plurality of fluid outlets may be provided each associated with one or more of the cylinders 506.

The operating fluid is delivered to the base of each cylinder 506. As operating fluid is delivered to the cylinders 508, the level of the operating fluid 518 in each of the cylinders 506 rises to decrease the available volume for hydrogen gas within the cylinder 506. The operating fluid 518 acts as a liquid piston.

The gas outlet 508 is positioned towards the top of the hydrogen gas storage unit 502. The fluid inlet 510 is positioned towards the base of the hydrogen gas storage unit 502. The fluid outlet 512 is positioned towards the base of the hydrogen gas storage unit 502 and, in this example, is positioned on the bottom system of the hydrogen gas storage unit 502.

The hydrogen gas compressor 104, 108, 112 further comprises a fluid delivery means 514 for delivering the operating fluid to the hydrogen gas storage unit 502 via the fluid inlet 510. A fluid reservoir 516 is also provided to store the operating fluid. The fluid deliver means 514 is a pump in this example and may be, for example, a centrifugal pump or positive displacement pump. The operating fluid is typically delivered at high pressure.

In operation, the fluid delivery means 514 is controlled to deliver operating fluid into the base of the cylinders 506 via the fluid inlet 510 so as to decrease the available volume for hydrogen gas within the cylinders 506. This causes the pressure of the hydrogen gas stored within the hydrogen gas storage unit 502 to increase. The fluid delivery means 514 may be controlled to deliver operating fluid at a controlled rate so as to maintain a desired delivery pressure and flow rate.

While not required in all examples, the hydrogen gas compressor system 104, 108, 112 advantageously further comprises a heat exchanger. The heat exchanger in this example is integrated with the hydrogen gas storage unit 502 and comprises a coolant fluid circuit via which coolant fluid may flow through the hydrogen gas storage unit 502 and extract heat from the hydrogen gas.

The coolant fluid is introduced via a coolant fluid inlet 520 of the hydrogen gas storage unit 502 and is removed via a coolant fluid outlet 522.

The coolant fluid may be water or other form of liquid coolant. It will of course be appreciated that air or vapour cooling may also be used.

The hydrogen gas compressor 104, 108, 112 further comprises a coolant fluid delivery means 524 (coolant pump in this example) for delivering the coolant fluid to the hydrogen gas storage unit 502 via the coolant fluid inlet 520. A coolant fluid reservoir 526 is also provided for storing coolant fluid.

In operation, the fluid delivery means 514 is controlled to deliver operating fluid into the base of the cylinders 506 via the fluid inlet 510 so as to decrease the available volume for hydrogen gas within the cylinders 506. This causes the pressure of the hydrogen gas stored within the hydrogen gas storage unit 502 to increase. The compression of the hydrogen gas causes the temperature of the hydrogen gas to increase. To combat this, the coolant fluid delivery means 524 is controlled to deliver coolant fluid to the coolant fluid inlet 520. The coolant fluid flows through the coolant fluid circuit to absorb heat from the hydrogen gas.

Without the use of the heat exchanger, compressing hydrogen gas from a pressure of 10 bar to a pressure of 350 bar can increase the temperature of the hydrogen gas to over 400 degrees Centigrade. This high temperature lowers the gas density (by about 50% in this example), which means that an even higher pressure must be generated to deliver the desired mass of gas from the hydrogen gas storage unit 502 via the gas outlet 508. A pressure of 650 bar may be required in this example which can lead to hydrogen gas temperatures of over 500 degrees Centigrade.

The generated high temperatures can impact the operation and durability of the components within the hydrogen gas compressor system 104, 108, 112 and the overall hydrogen gas delivery system 100, 200, 300, 400 (FIGS. 1 to 4). Moreover, the high temperatures also required increased energy input for compression which reduce the efficiency of the process. Further, the high temperatures increase the energy input required for compression. Delivering hydrogen gas at 350 bar requires in the region of 5 MJ/kg whereas delivering hydrogen gas at 800 bar requires in the region of 7 MJ/kg.

Beneficially, the utilisation of the heat exchanger allows for the temperature rise of the hydrogen gas during compression to be controlled. The coolant fluid absorbs heat from the hydrogen gas, offsetting the temperature rise, and allowing for near isothermal compression.

The hydrogen gas compressor 104, 108, 112 may further comprise a gas inlet (not shown) via which hydrogen gas is introduced into the hydrogen gas storage unit 502. A further compressor stage may be provided to initially compress the gas prior to introduction to the gas inlet.

Figure 6:
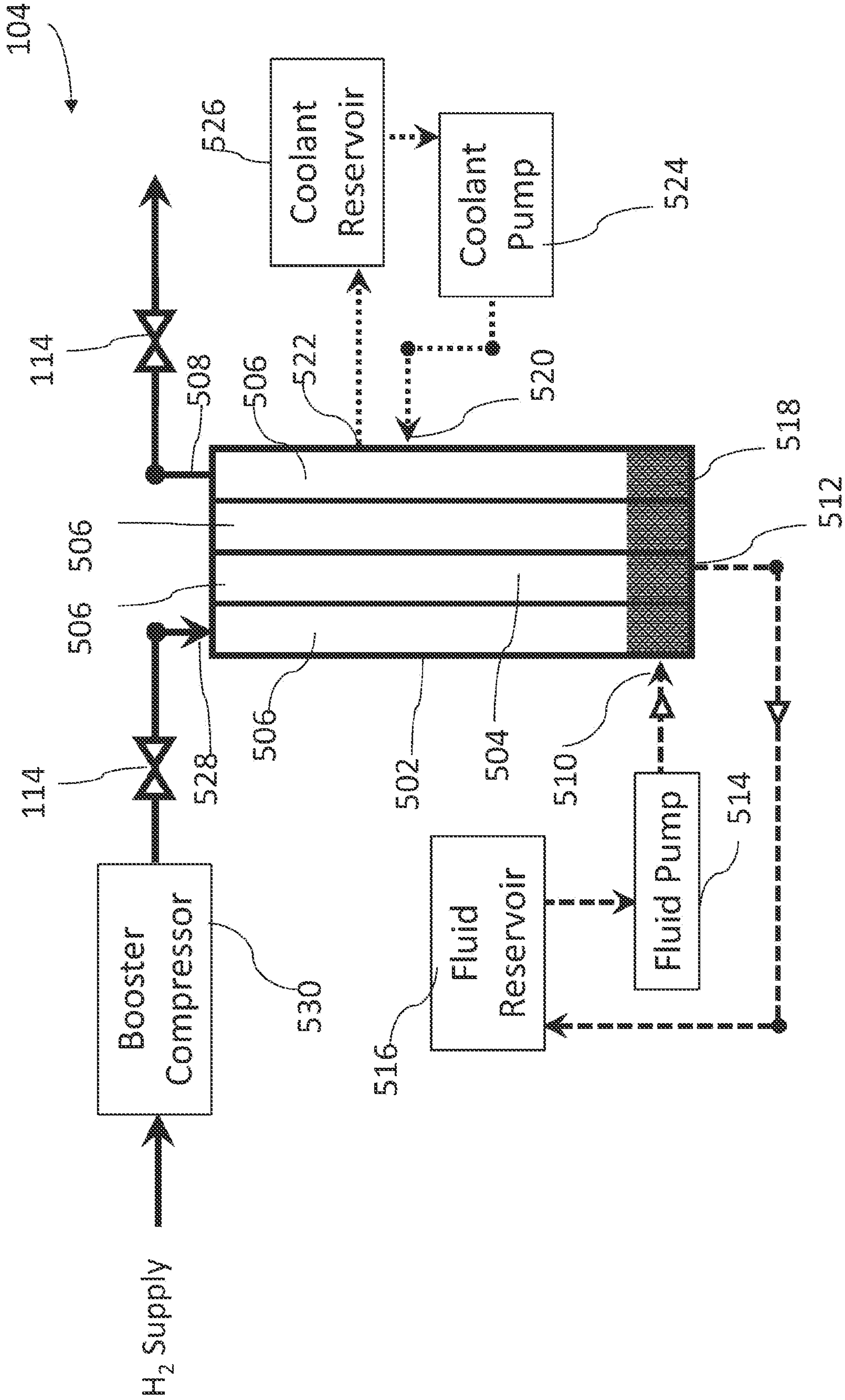

FIG. 6 shows an example hydrogen gas compressor system 104 in accordance with aspects of the present disclosure. The hydrogen gas compressor 104 in this example is used to compress hydrogen gas produced by the hydrogen gas production system 102 (FIGS. 1 to 4).

The hydrogen gas compressor system 104 comprises the features of the hydrogen gas compressor system described above in relation to FIG. 5. Like references are used to indicate like components.

The hydrogen storage stank 502 comprises a gas inlet 506 by which hydrogen gas produced by the hydrogen gas production system 102 is introduced into the hydrogen gas storage unit 502.

The hydrogen gas compressor system 104 further comprises an initial, booster, compressor 530 that performs an initial compression of the hydrogen gas prior to the introduction of the hydrogen gas to the hydrogen gas storage unit 502. The booster compressor 530 may be in the form of a conventional mechanical compressor or may use a similar approach to compression to the hydrogen gas storage unit 502. That is, the booster compressor 530 may comprise a hydrogen gas storage unit, operating fluid delivery means for raising the pressure within the hydrogen gas storage unit and optionally a coolant fluid delivery means.

Valve 114 controls the flow of hydrogen gas from the hydrogen gas outlet 508.

In operation, hydrogen gas is generated by the hydrogen gas production system and flows to the hydrogen gas compressor system 104 at a low pressure in the region of 5 to 15 bar. The pressure of the hydrogen gas is initially boosted by the booster compressor 530 to a pressure of around 50 bar before flowing into the hydrogen gas storage unit 502. The fluid delivery means 514 is controlled to deliver operating fluid into the base of the cylinders 506 via the fluid inlet 510 so as to decrease the available volume for hydrogen gas within the cylinders 506. This causes the pressure of the hydrogen gas stored within the hydrogen gas storage unit 502 to increase. The compression of the hydrogen gas causes the temperature of the hydrogen gas to increase. To combat this, the coolant fluid delivery means 524 is controlled to deliver coolant fluid to the coolant fluid inlet 520. The coolant fluid flows through the coolant fluid circuit to absorb heat from the hydrogen gas.

Figure 7:
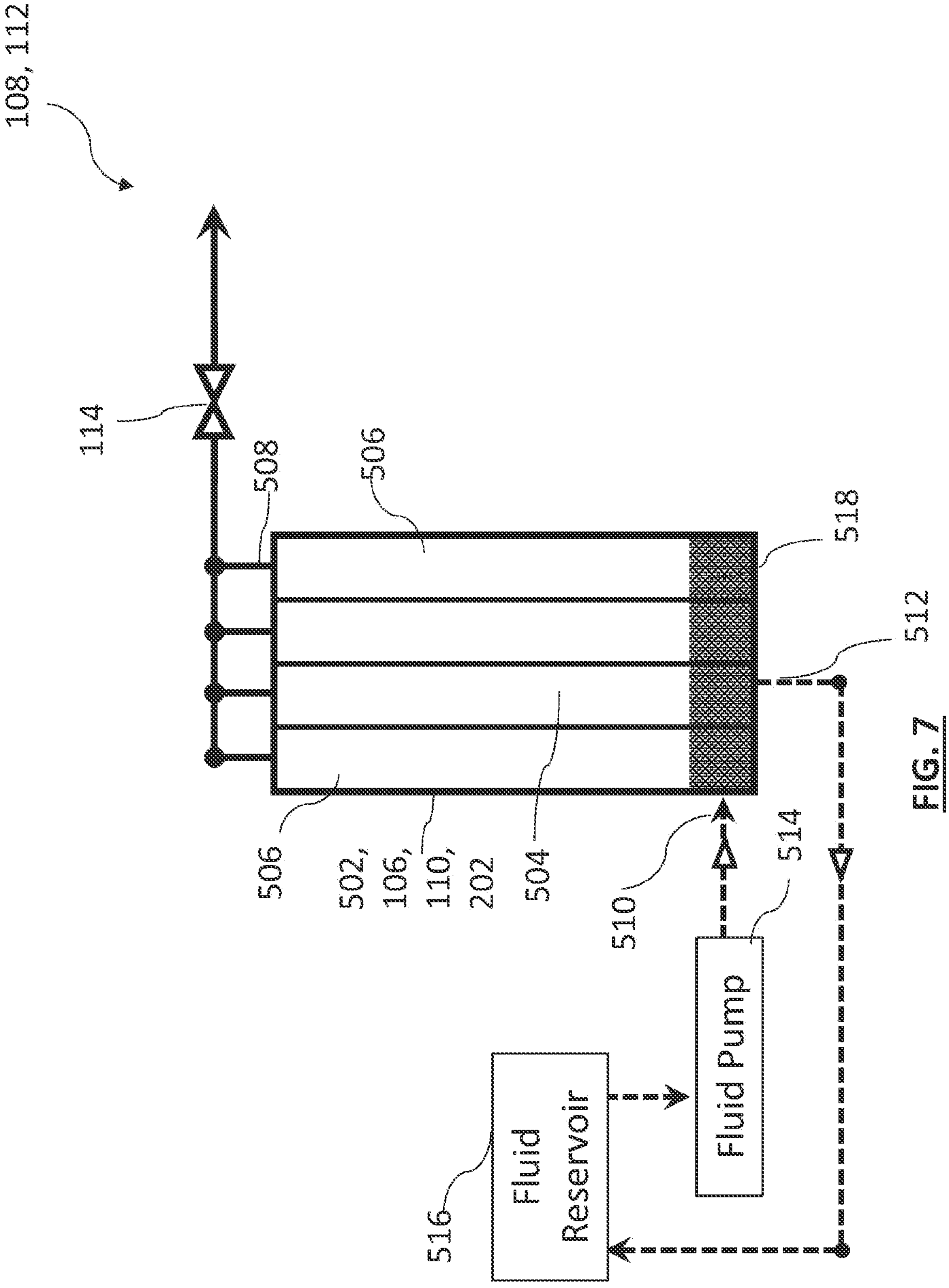

FIG. 7 shows an example hydrogen gas compressor system 108, 112 in accordance with aspects of the present disclosure. The hydrogen gas compressor system 108, 112 in this example is used to transfer hydrogen to a storage tank (transfer compressor system 108) or deliver hydrogen to a consumer (fuel compressor system 112).

The hydrogen gas compressor system 108, 112 comprises the features of the hydrogen gas compressor system described above in relation to FIG. 5. Like references are used to indicate like components.

In this example, the hydrogen gas storage unit 502 does not comprise heat exchanger although this may be provided if desired. The hydrogen gas storage unit 502 does not comprise a coolant fluid inlet, coolant fluid outlet, coolant pump or coolant reservoir. Generally, a heat exchanger is not required in this example as the pressure of the hydrogen gas is not required to be increased by a large amount (e.g., from 10 bar to 350 bar as per the hydrogen gas compressor 104 of FIG. 6). Instead, the hydrogen gas compressor system 108, 112 is generally used to ensure a consistent delivery of already compressed gas from the hydrogen gas storage unit 502.

In some examples, the hydrogen gas compressor system 108, 112 is a dedicated compressor system. The dedicated compressor system 108, 112 is positioned between a hydrogen supply unit and a hydrogen receiver unit.

In preferred examples, the hydrogen gas compressor system 108, 112 is not a dedicated compressor system and instead utilises an existing hydrogen gas storage unit storing hydrogen gas as the hydrogen gas storage unit 502. The hydrogen gas storage unit 502 may be the mobile storage tank 106, main storage tank 110, or stacked storage tank 202 as described above in relation to FIGS. 1 to 4. This approaches reduces the complexity of gas delivery from the storage tanks as fewer components are required.

The hydrogen gas storage unit 502 may therefore be detachably coupled to the fluid delivery means and, if present, the coolant delivery means. The hydrogen gas storage unit 502 may be transported to a fueling location and coupled to the fluid deliver means 514 and, if present the coolant delivery means to allow for the compression of hydrogen gas contained within the hydrogen gas storage unit 502.

In contrast to existing hydrogen gas compressor system, the hydrogen gas storage unit 502 may have a large volume for storing hydrogen gas. The hydrogen gas storage unit 502 may have a volume of at least 10 $m^3$ such as when the hydrogen gas storage unit is a mobile storage tank 106 or a volume of at least 70 $m^3$ when the hydrogen gas storage unit is a main storage tank 110.

In operation, the hydrogen gas storage unit 502 is coupled to the fluid delivery means 514. Gas is withdrawn from the gas outlet 508. The withdrawn gas is transferred to a receiver storage unit such as main storage tank 110, stacked storage tank 202 or a storage unit incorporated into a vehicle. The fluid delivery means 514 is controlled to deliver operating fluid to the hydrogen gas storage unit 502 to compensate for the pressure drop caused by hydrogen gas being withdrawn from the hydrogen gas storage unit 502 and allow for consistent hydrogen gas delivery from the hydrogen gas storage unit 502 to the receiver storage unit. After hydrogen gas delivery, the operating fluid may be allowed to flow via fluid outlet 512 back to the fluid reservoir. This flow may be driven by the residual gas pressure within the hydrogen gas storage unit.

Figure 8:
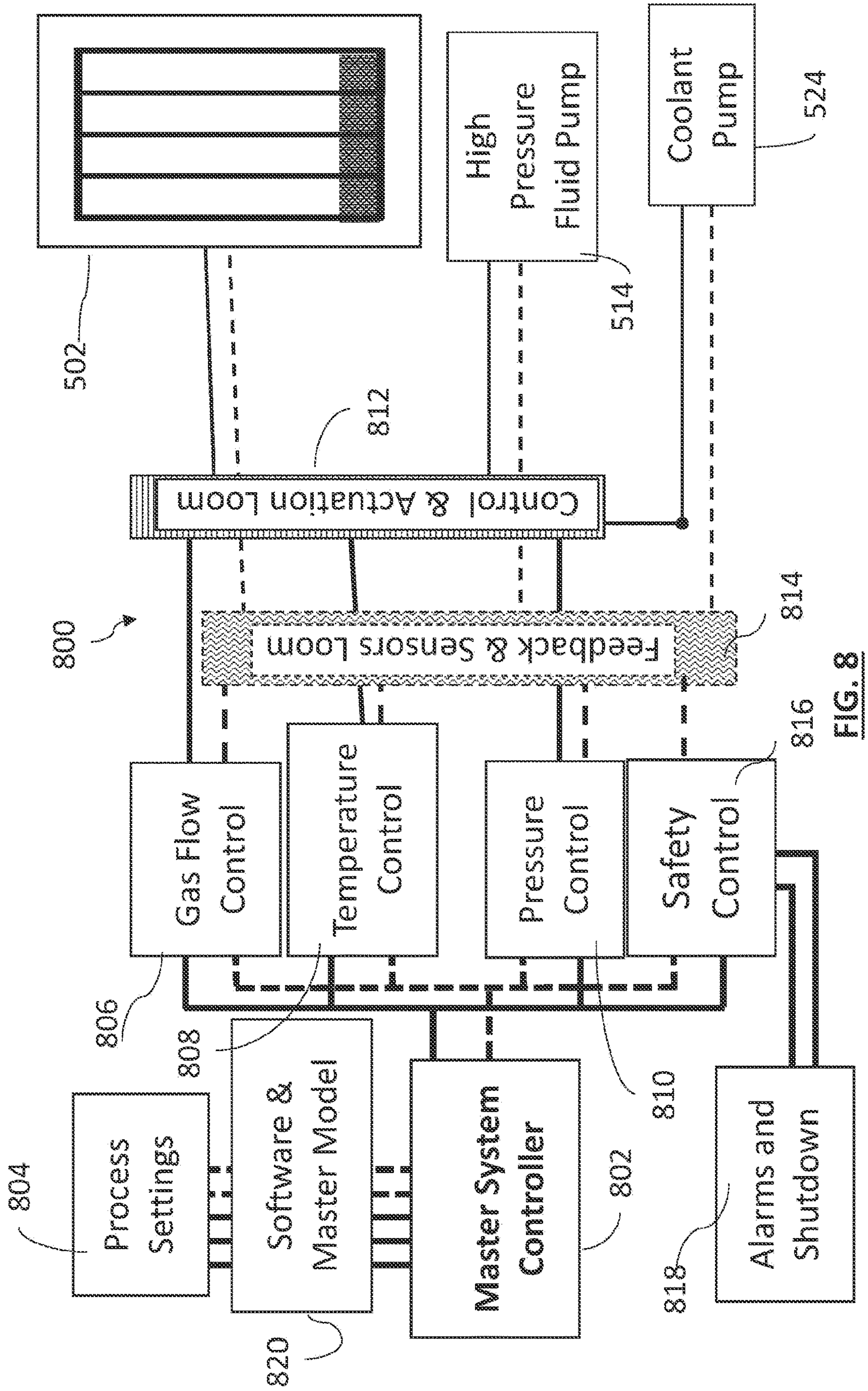
FIG. 8 shows a schematic diagram for an example control system for controlling a hydrogen gas compressor system according to aspects of the present disclosure.

FIG. 8 shows a control system 800 used to control and/or monitor the operation of the hydrogen gas compressor system 104, 108, 112 according to aspects of the present disclosure. In the Figure, solid lines indicate control signals and dashed lines indicate feedback and/or sensor signals.

The control system 800 typically comprises a master system controller 802 which is typically implemented by one or more suitable programmed or configured hardware, firmware and/or software controllers, e.g. comprising one or more suitable programmed or configured microprocessor, microcontroller or other processor, for example an IC processor such as an ASIC, DSP or FPGA (not illustrated).

In preferred examples, the control system 800 communicates control information to other components of the system such as valves 114, operating fluid delivery means 514, and coolant fluid delivery means 524. Process settings may be received via a process setting interface unit 804. The process settings may specify environmental conditions, for example in relation to temperature(s), flow rate(s), and/or pressure(s).

In the example shown in FIG. 8, a gas flow control module 806 generates control signals for controlling the gas flow rate, a temperature control module 808 generates control signals for controlling the temperature, a pressure control module 810 generates control signals for controlling the pressure. The control signals are supplied to a control and actuation loom 812 which routes the control signals to the desired components of the hydrogen gas compressor system.

The control system 800 may also receive feedback information from other components such as sensors (e.g. incorporated into the hydrogen gas storage unit 502), measurement devices (e.g. incorporated into the hydrogen gas storage unit 502), valves 114, and/or fluid delivery means 514, 524, in response to which the control system 800 may issue control information to one or more relevant components. The feedback information is received via a feedback and sensor loom 814 in this example.

The control system 800 may perform analysis of the measurements or other information provided. This analysis may be carried out automatically in real time by the control system 800. Alternatively, or in addition, analysis of the system measurements and performance may be made by an operator in real time or offline. The operator may adjust the operation of the hydrogen gas compressor system by providing control instructions via the process settings interface 804.

A safety control module 816 may be provided, which may receive alarm signals from one or more alarm sensors (not shown), e.g. gas sensors, temperature sensors, leak detectors or emergency stops that may be included in the hydrogen gas compressor system. The safety control module 816 provides alarm information to the master controller 802 based on the alarm signals received from the alarm sensors. The safety control module 816 may also control an alarm and shutdown module 818 to generate an alarm for the operator and/or shutdown the operation of the hydrogen gas compressor system.

In preferred examples, the control system 800, and more particularly the master controller 802 is configured to implement system modelling logic, e,g., by supporting mathematical modelling software or firmware 820, for enabling the control system 800 to mathematically model the behaviour of the hydrogen gas compressor system, depending on the process settings and/or on feedback signals received from one or more system components during operation of the hydrogen gas compressor system.

Optionally, the control system 800 is configured to implement Model Predictive Control (MPC). Using MPC, the control system 800 causes the control action of the control modules 806, 808, 810, 816 to be adjusted before a corresponding deviation from a relevant process set point actually occurs. This predictive ability, when combined with traditional feedback operation, enables the control system 800 to make adjustments that are smoother and closer to the optimal control action values that would otherwise be obtained. A control model can be written in Matlab, Simulink, or Labview by way of example and executed by the master controller 802. Advantageously, MPC can handle MIMO (Multiple Inputs, Multiple Outputs) systems.

Figure 9:
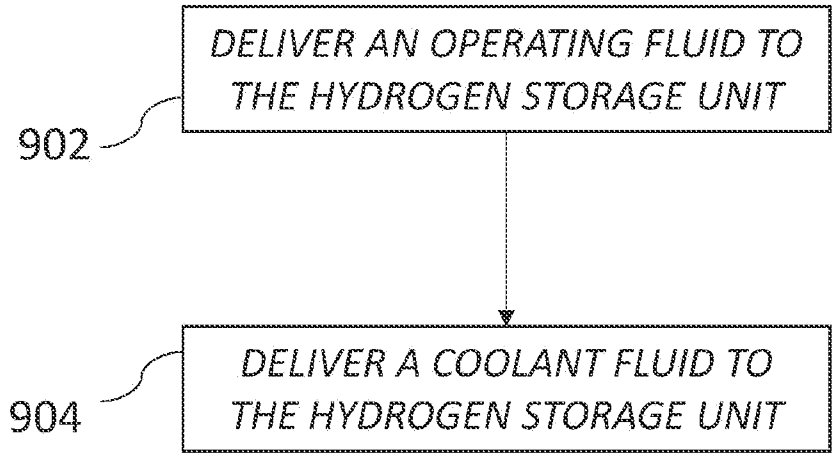
FIGS. 9 and 10 show flow diagrams of example methods of compressing hydrogen gas according to aspects of the present disclosure.

FIG. 9 shows an example method of compressing hydrogen gas according to aspects of the present disclosure. Step 902 of the method comprises delivering an operating fluid to a hydrogen gas storage unit to increase the pressure of hydrogen gas contained within the hydrogen gas storage unit. Step 904 of the method comprises delivering a coolant fluid to the hydrogen gas storage unit to absorb heat from the hydrogen gas.

Figure 10:
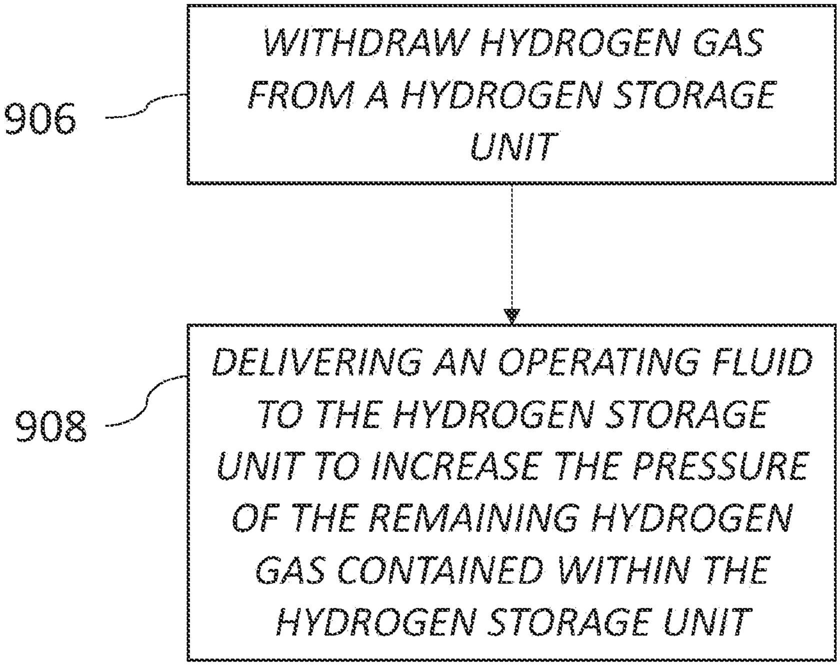

FIG. 10 shows an example method of compressing hydrogen gas according to aspects of the present disclosure. Step 906 comprises withdrawing hydrogen gas from a hydrogen gas storage unit. Step 908 comprises delivering an operating fluid to the hydrogen gas storage unit to increase the pressure of the remaining hydrogen gas contained within the hydrogen gas storage unit.

Figure 11:
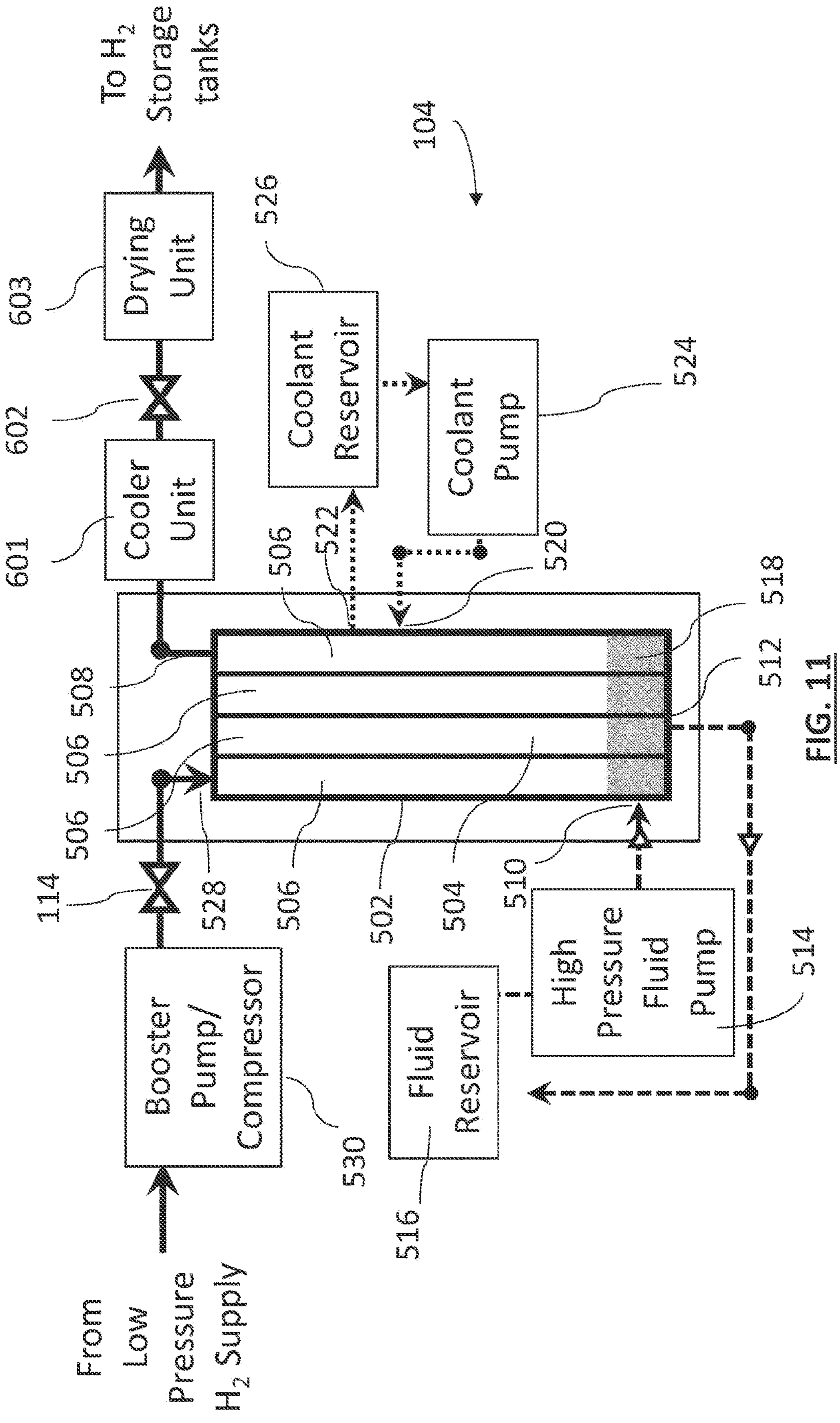
FIGS. 11 to 13 show schematic diagrams of example hydrogen gas compressor systems at the production site, for transfer pumping and for pumping at the fuel site respectively according to further aspects of the present disclosure.

FIG. 11 shows a further example of a hydrogen gas compressor system 104 for use at the hydrogen production site in accordance with aspects of the present disclosure. The hydrogen gas compressor 104 in this example is also used to compress hydrogen gas produced by the hydrogen gas production system 102 (FIGS. 1 to 4).

The hydrogen gas compressor system 104 comprises the features of the hydrogen gas compressor system described above in relation to FIG. 5. Like references are used to indicate like components.

The hydrogen storage stank 502 comprises a gas inlet 506 by which hydrogen gas produced by the hydrogen gas production system 102 is introduced into the hydrogen gas storage unit 502.

The hydrogen gas compressor system 104 further comprises an initial, booster, compressor 530 that performs an initial compression of the hydrogen gas prior to the introduction of the hydrogen gas to the hydrogen gas storage unit 502. The booster compressor 530 may be in the form of a conventional mechanical compressor or may use a similar approach to compression to the hydrogen gas storage unit 502. That is, the booster compressor 530 may comprise a hydrogen gas storage unit, operating fluid delivery means for raising the pressure within the hydrogen gas storage unit and optionally a coolant fluid delivery means.

In this embodiment illustrated in FIG. 11, the hydrogen gas outlet 508 has a cooler unit 601 for cooling the compressed hydrogen gas at the outlet 508 followed by a pressure control valve 602 for regulating the pressure of the compressed hydrogen gas at the outlet 508. The pressure control valve 602 leads to a drying unit 603 for removing water vapour from the compressed hydrogen gas. It will of course be appreciated that the drying unit 603 may be adapted for different types of drying, condensation, desiccant or membrane for example.

In operation, hydrogen gas is generated by the hydrogen gas production system and flows to the hydrogen gas compressor system 104 at a low pressure in the region of 5 to 15 bar. The pressure of the hydrogen gas is initially boosted by the booster compressor 530 to a pressure of around 50 bar before flowing into the hydrogen gas storage unit 502. The fluid delivery means 514 is controlled to deliver operating fluid into the base of the cylinders 506 via the fluid inlet 510 so as to decrease the available volume for hydrogen gas within the cylinders 506. This causes the pressure of the hydrogen gas stored within the hydrogen gas storage unit 502 to increase. The compression of the hydrogen gas causes the temperature of the hydrogen gas to increase. To combat this, the coolant fluid delivery means 524 is controlled to deliver coolant fluid to the coolant fluid inlet 520. The coolant fluid flows through the coolant fluid circuit to absorb heat from the hydrogen gas. At the outlet, the compressed hydrogen gas is further cooled by the cooler unit 601 and the pressure is regulated by pressure regulating valve 602 and some form of drying such as condensation, desiccant or membrane drying is provided by the drying unit 603 prior to delivery of the compressed gas to the storage tanks.

Figure 12:
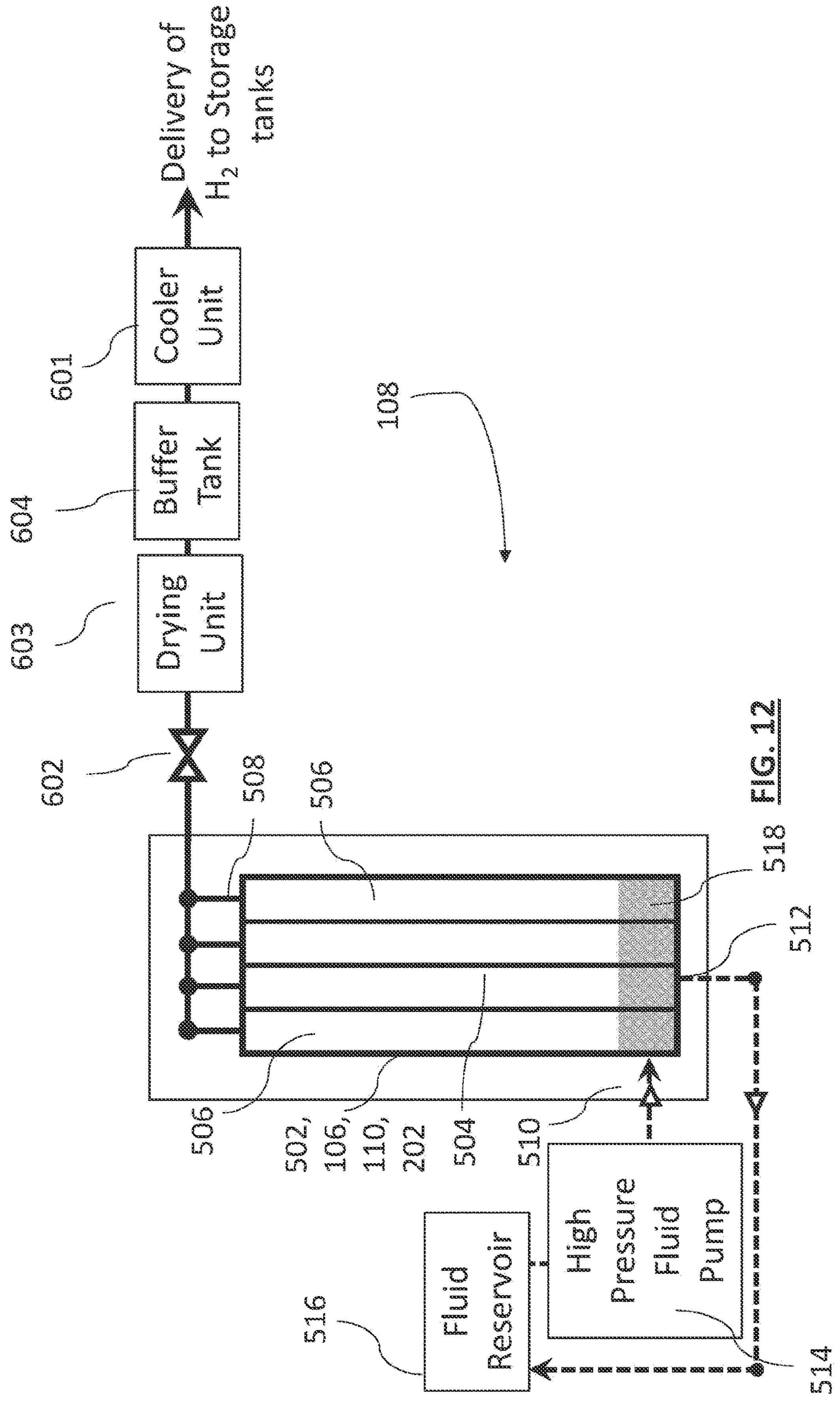
Figure 13:
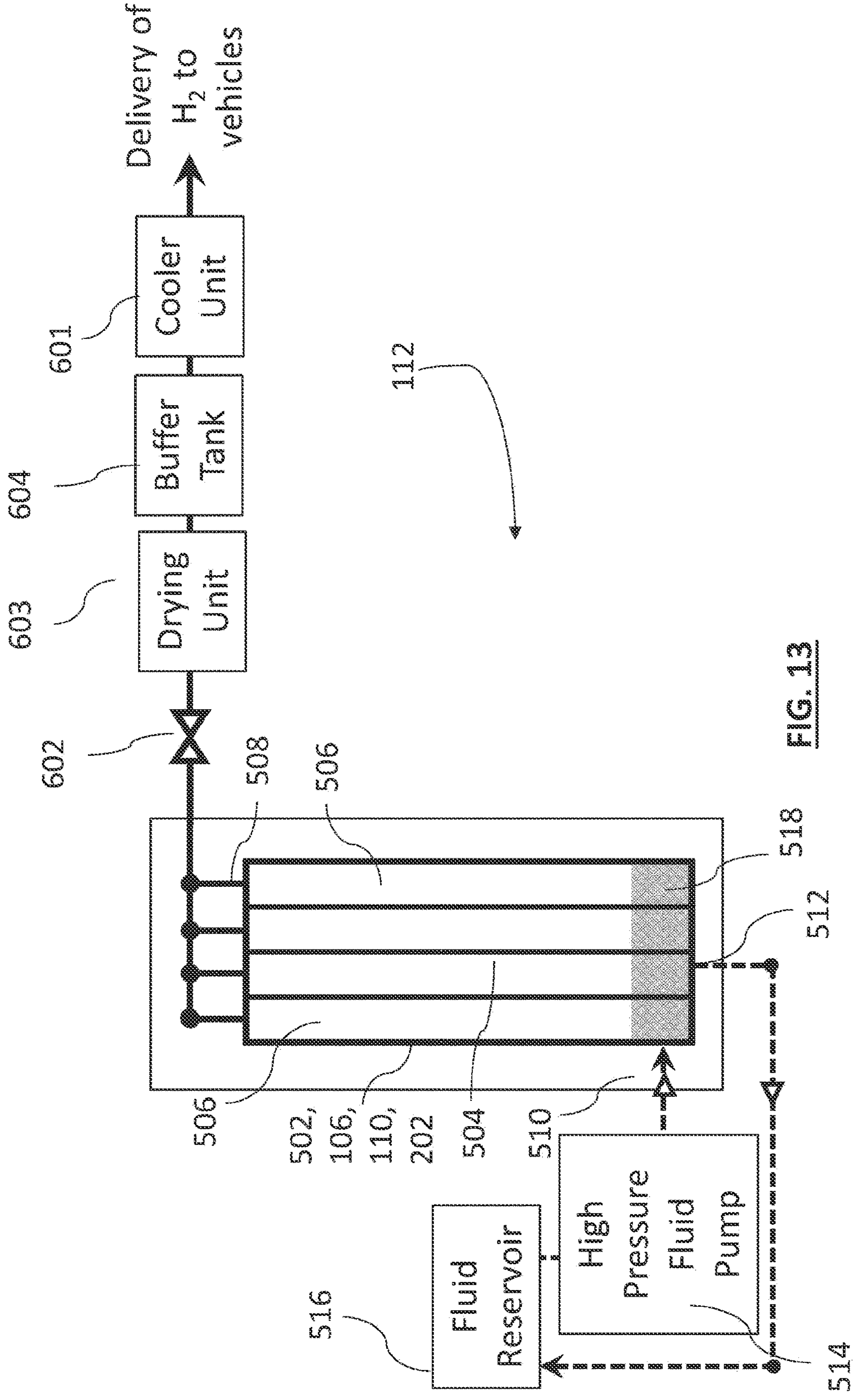

FIG. 12 and FIG. 13 shows further examples of hydrogen gas compressor system 108, 112 in accordance with aspects of the present disclosure. The hydrogen gas compressor system 108, 112 in this example is used to transfer hydrogen to a storage tank (transfer compressor system 108) as illustrated in FIG. 12 or deliver hydrogen to a consumer (fuel compressor system 112) as illustrated in FIG. 13.

The hydrogen gas compressor system 108, 112 comprises the features of the hydrogen gas compressor system described above in relation to FIG. 5. Like references are used to indicate like components.

In this example, the hydrogen gas storage unit 502 does not comprise heat exchanger although this may be readily provided if desired. The hydrogen gas storage unit 502 does not comprise a coolant fluid inlet, coolant fluid outlet, coolant pump or coolant reservoir. Generally, a heat exchanger is not required in this example as the pressure of the hydrogen gas is not required to be increased by a large amount (e.g., from 10 bar to 350 bar as per the hydrogen gas compressor 104 of FIG. 6 or FIG. 11). Instead, the hydrogen gas compressor system 108, 112 is generally used to ensure a consistent delivery of already compressed gas from the hydrogen gas storage unit 502.

In some examples, the hydrogen gas compressor system 108, 112 is a dedicated compressor system. The dedicated compressor system 108, 112 is positioned between a hydrogen supply unit and a hydrogen receiver unit.

In preferred examples, the hydrogen gas compressor system 108, 112 is not a dedicated compressor system and instead utilises an existing hydrogen gas storage unit storing hydrogen gas as the hydrogen gas storage unit 502. The hydrogen gas storage unit 502 may be the mobile storage tank 106 as illustrated in FIG. 12, main storage tank 110, or stacked storage tank 202 as described above in relation to FIGS. 1 to 4. This approach reduces the complexity of gas delivery from the storage tanks as fewer components are required.

The hydrogen gas storage unit 502 may therefore be detachably coupled to the fluid delivery means and, if present, the coolant delivery means. The hydrogen gas storage unit 502 may be transported to a fueling location illustrated in FIG. 13 and coupled to the fluid delivery means 514 and, if present the coolant delivery means to allow for the compression of hydrogen gas contained within the hydrogen gas storage unit 502.

In contrast to existing hydrogen gas compressor system, the hydrogen gas storage unit 502 may have a large volume for storing hydrogen gas. The hydrogen gas storage unit 502 may have a volume of at least 10 $m^3$ such as when the hydrogen gas storage unit is a mobile storage tank 106 or a volume of at least 70 $m^3$ when the hydrogen gas storage unit is a main storage tank 110.

In operation, the hydrogen gas storage unit 502 is coupled to the fluid delivery means 514. Gas is withdrawn from the gas outlet 508. The withdrawn gas is transferred to a receiver storage unit such as main storage tank 110, stacked storage tank 202 or a storage unit incorporated into a vehicle. The fluid delivery means 514 is controlled to deliver operating fluid to the hydrogen gas storage unit 502 to compensate for the pressure drop caused by hydrogen gas being withdrawn from the hydrogen gas storage unit 502 and allow for consistent hydrogen gas delivery from the hydrogen gas storage unit 502 to the receiver storage unit. After hydrogen gas delivery, the operating fluid may be allowed to flow via fluid outlet 512 back to the fluid reservoir. This flow may be driven by the residual gas pressure within the hydrogen gas storage unit.

In both FIGS. 12 and 13, the hydrogen gas outlet 508 has a pressure control valve 602 for regulating the pressure of the compressed hydrogen gas at the outlet 508. The pressure control valve 602 leads to a drying unit 603 for removing water vapour from the compressed hydrogen gas. It will of course be appreciated that the drying unit 603 may be adapted for different types of drying, condensation, desiccant or membrane for example. The drying unit 603 delivers compressed hydrogen gas to a buffer tank 604 which in turn delivers the compressed hydrogen gas to a cooler unit 601 for cooling the compressed hydrogen gas.

Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of delivering hydrogen gas in a hydrogen gas delivery system, said delivery system being a system for delivering hydrogen gas from a hydrogen gas production site to an end consumer, wherein the method of delivering hydrogen gas in a hydrogen gas delivery system comprises:

compressing hydrogen gas in a hydrogen gas compressor system, wherein compressing hydrogen gas in a hydrogen gas compressor system comprises:

delivering an operating fluid into the internal volume of a hydrogen gas storage unit of the hydrogen gas compressor system to increase the pressure of hydrogen gas contained within the hydrogen gas storage unit; and delivering a coolant fluid to the internal volume of the hydrogen gas storage unit to absorb heat from the hydrogen gas, wherein the coolant fluid flows through a coolant fluid circuit of a heat exchanger integrated into the hydrogen gas storage unit, said coolant fluid circuit traversing through the internal volume of the hydrogen gas storage unit;

wherein the method of delivering hydrogen gas in a hydrogen gas delivery system comprises dispensing the compressed hydrogen gas, wherein dispensing the compressed hydrogen gas comprises:

withdrawing the compressed hydrogen gas from a gas outlet of the hydrogen gas storage unit; and delivering the operating fluid to the internal volume of the hydrogen gas storage unit in response to the compressed hydrogen gas being withdrawn from the hydrogen gas storage unit so as to increase or sustain the pressure of the remaining hydrogen gas contained within the hydrogen gas storage unit;

and wherein the operating fluid acts as a liquid piston.

2. The method of delivering hydrogen gas in a hydrogen gas delivery system as claimed in claim 1, wherein the operating fluid is water.

3. The method of delivering hydrogen gas in a hydrogen gas delivery system as claimed in claim 1, wherein the operation of the hydrogen gas compressor system is controlled and/or monitored via operation of a control system comprising a master system controller, and wherein the delivery of coolant fluid and operating fluid to the hydrogen gas storage unit is controlled by the master system controller.

4. The method of delivering hydrogen gas in a hydrogen gas delivery system as claimed in claim 3, wherein the control system is configured to implement Model Predictive Control.

5. The method of delivering hydrogen gas in a hydrogen gas delivery system as claimed in claim 1, wherein the hydrogen gas compressor system is a multi-stage hydrogen gas compressor system.

6. The method of delivering hydrogen gas in a hydrogen gas delivery system as claimed in claim 1, wherein the method further comprises cooling of the withdrawn compressed hydrogen gas at the gas outlet using a cooling means and/or drying of the withdrawn compressed hydrogen gas at the gas outlet using a drying means prior to delivery of the compressed hydrogen gas to a receiver unit.

7. The method of delivering hydrogen gas in a hydrogen gas delivery system as claimed in claim 1, wherein the method further comprises introducing hydrogen gas produced by a hydrogen gas production system via a gas inlet of the hydrogen gas storage unit.

8. The method of delivering hydrogen gas in a hydrogen gas delivery system as claimed in claim 1, wherein the hydrogen gas compressor system is a transfer compressor system that is used to deliver the compressed hydrogen gas to a storage tank as the receiver unit.

9. The method of delivering hydrogen gas in a hydrogen gas delivery system as claimed in claim 8, wherein the hydrogen gas storage unit of the transfer compressor is a mobile storage tank.

10. The method of delivering hydrogen gas in a hydrogen gas delivery system as claimed in claim 1, wherein the hydrogen gas compressor system is a fuel compressor system that is used to deliver the compressed hydrogen gas from storage to the end consumer.

11. A hydrogen gas compressor system for compressing and dispensing hydrogen gas, wherein the hydrogen gas compressor system comprises:

a hydrogen gas storage unit defining an internal volume for storing hydrogen gas, wherein the hydrogen gas storage unit comprises: an operating fluid inlet via which an operating fluid is delivered to the internal volume of the hydrogen gas storage unit to act as a liquid piston, an operating fluid outlet via which the operating fluid is withdrawn from the hydrogen gas storage unit, a gas inlet via which hydrogen gas is delivered to the internal volume of the hydrogen gas storage unit, a gas outlet via which hydrogen gas is withdrawn from the hydrogen gas storage unit, and a heat exchanger integrated into the hydrogen gas storage unit, said heat exchanger comprising a coolant fluid circuit traversing through the internal volume and via which a coolant fluid flows to absorb heat from the hydrogen gas;

an operating fluid delivery means for delivering the operating fluid into the internal volume of the hydrogen gas storage unit via the operating fluid inlet, wherein the operating fluid delivery means is arranged to deliver the operating fluid to the hydrogen gas storage unit to increase the pressure of hydrogen gas contained within the hydrogen gas storage unit so as to compress the hydrogen gas contained therein, and wherein the operating fluid delivery means is further arranged to deliver the operating fluid in response to the compressed hydrogen gas being withdrawn from the hydrogen gas storage unit so as to increase or sustain the pressure of the remaining hydrogen gas contained within the hydrogen gas storage unit;

and a coolant fluid delivery means arranged to deliver the coolant fluid to the hydrogen gas storage unit to flow through the coolant fluid circuit to absorb heat from the hydrogen gas.

12. The hydrogen gas compressor system as claimed in claim 11, wherein the operating fluid is water.

13. The hydrogen gas compressor system as claimed in claim 11, wherein the hydrogen gas compressor system further comprises a control system used to control and/or monitor the operation of the hydrogen gas compressor system, wherein the control system comprises a master system controller for controlling the delivery of operating fluid and coolant fluid to the hydrogen gas storage unit.

14. The hydrogen gas compressor system as claimed in claim 13, wherein the control system is configured to implement Model Predictive Control.

15. The hydrogen gas compressor system as claimed in claim 11, wherein the gas outlet of the hydrogen gas storage unit further comprises a cooling means for cooling the hydrogen gas withdrawn from the internal volume of the hydrogen gas storage unit and/or a drying means for drying the hydrogen gas withdrawn from the internal volume of the hydrogen gas storage unit.

16. The hydrogen gas compressor system as claimed in claim 11, wherein the gas outlet further comprises a pressure regulating valve for regulating the pressure of the compressed hydrogen gas at the outlet, said pressure regulating valve following the cooling means.

17. The hydrogen gas compressor system as claimed in claim 11, wherein the hydrogen gas storage unit has an internal volume greater than 10 m3.

18. The hydrogen gas compressor system as claimed in claim 11, wherein the hydrogen gas compressor system is a multi-stage hydrogen gas compressor system.

19. The hydrogen gas compressor system as claimed in claim 11, wherein the hydrogen gas compressor system is located at a hydrogen gas production site and is arranged to receive low pressure hydrogen gas from a hydrogen gas production system and to compress the hydrogen gas to a higher pressure for transport to a fueling location or for storage in an on-site storage tank.

20. The hydrogen gas compressor system as claimed in claim 11, wherein the hydrogen gas compressor system is a transfer compressor system used to transfer hydrogen to a storage tank.

21. The hydrogen gas compressor system as claimed in claim 20, wherein the hydrogen gas compressor system is arranged to transfer hydrogen gas transported via a pipeline system to the storage tank and to further compress the transported hydrogen gas to a higher pressure.

22. The hydrogen gas compressor system as claimed in claim 20, wherein the hydrogen gas storage unit of the transfer compressor system is a mobile storage tank.

23. The hydrogen gas compressor system as claimed in claim 11, wherein the hydrogen gas compressor system is a fuel compressor system used to deliver hydrogen gas to the end consumer.

* * * * *